United States Patent [19]

McLaughlin

[11] 4,365,670

[45] Dec. 28, 1982

[54] METHODS OF FORMING ISOCYANATE POLYMERS FOR EARTH-SEALING OPERATIONS

[75] Inventor: Homer C. McLaughlin, Duncan, Okla.

[73] Assignee: Halliburton Company, Duncan, Okla.

[21] Appl. No.: 155,714

[22] Filed: Jun. 2, 1980

Related U.S. Application Data

[62] Division of Ser. No. 17,639, Mar. 5, 1979, Pat. No. 4,264,486.

[51] Int. Cl.$^3$ .................... C08G 18/14; C08G 18/22; E21B 31/13
[52] U.S. Cl. .................... 166/295; 521/124; 521/126; 521/127; 521/129; 521/174; 521/914; 521/917; 524/906; 524/476; 524/590; 528/54; 528/55; 528/61; 528/64; 528/59; 528/75
[58] Field of Search .................. 528/59, 54, 61, 64, 528/75, 55; 521/174, 914, 917, 124, 126, 127, 129; 166/295

[56] References Cited

U.S. PATENT DOCUMENTS

| | | | |
|---|---|---|---|
| 2,867,278 | 1/1959 | Mallory et al. | 166/295 |
| 2,889,883 | 6/1959 | Santora | 166/295 |
| 2,929,800 | 3/1960 | Hill | 528/64 |
| 3,136,731 | 6/1964 | Piechota et al. | 528/54 |
| 3,181,611 | 5/1965 | Dollarhide | 166/295 |
| 3,181,612 | 5/1965 | West et al. | 166/295 |
| 3,192,185 | 6/1965 | Achterhof et al. | 260/75 |
| 3,338,861 | 8/1967 | Mastin et al. | 528/75 |
| 3,427,366 | 2/1969 | Verdol et al. | 528/75 |
| 3,462,083 | 8/1969 | Kautz | 521/917 |
| 3,523,103 | 8/1970 | Zemlin | 528/58 |
| 3,623,330 | 11/1971 | Nakade et al. | 61/36 R |
| 3,652,508 | 3/1972 | Segur et al. | 260/77.5 A |
| 3,799,898 | 3/1974 | Lamplugh et al. | 521/114 |
| 3,814,736 | 6/1974 | Gibier-Ramband et al. | 260/77.5 AC |
| 3,894,131 | 7/1975 | Speech | 264/45.2 |
| 4,020,125 | 4/1977 | Suzuki et al. | 528/75 |
| 4,113,014 | 9/1978 | Kubans et al. | 524/906 |
| 4,145,515 | 3/1979 | Pogozelski et al. | 528/54 |

*Primary Examiner*—H. S. Cockeram
*Attorney, Agent, or Firm*—G. Keith deBrucky; Clark Dougherty

[57] ABSTRACT

Methods of sealing particular areas, including subterranean well formations, are provided wherein the methods utilize an isocyanate polymer suitable as a sealing agent having a controllable gelation time in the presence of water without formation of excess foam by using one or more typical di- or polyisocyanates with one or more alcoholic or acidic compounds and a particular catalyst namely, triethylene-diamine, Groups 3 and 4 metal-organic compounds or mixtures thereof. A particularly useful catalyst is tributyl titanate.

4 Claims, No Drawings

METHODS OF FORMING ISOCYANATE POLYMERS FOR EARTH-SEALING OPERATIONS

This is a division, of application Ser. No. 17,639, filed Mar. 5, 1979 now U.S. Pat. No. 4,264,486.

Isocyanate polymers have been utilized heretofore for a variety of purposes. For example, such polymers have been used extensively in making plastic products, adhesives, waterproofing compositions, etc. In addition, such polymers have been utilized as sealants in mines, dams, sewers and the like and in treating subterranean well formations.

Isocyanate polymers, commonly referred to as "polyurethanes", have heretofore been formed by reacting isocyanate groups or radicals, —NCO, with active hydrogen such as alcoholic OH, acidic H, amine H and water OH in accordance with the following reactions respectively:

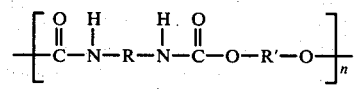

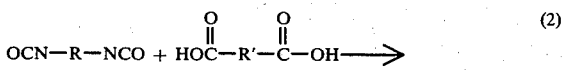

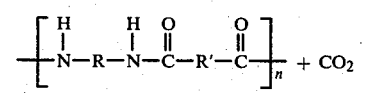

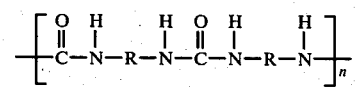

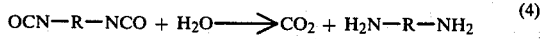

Reaction (1) produces a polyurethane, reaction (2) produces polyamides and reaction (3) produces polyureas. Reactions (3) and (4) are the basis for producing foamed polyurea.

Isocyanate polymers are particularly suitable for sealing areas or leaks in oil and gas wells, e.g., sealing areas of formations to prevent or stop lost circulation, sealing undesirable formations, sealing tubing leaks, sealing channels in cement behind casing, carrying out downhole grouting procedures, etc. However, problems have been encountered with premature gelation of the polymers and the production of excessive foam. In treating subterranean well formations, the components for producing the isocyanate polymers must be mixed at the surface and then pumped or otherwise passed through the well bore into the formation or area in the well to be treated. Thus, a relatively long time prior to gelation is required. Because the isocyanate compounds utilized readily react with water to form amines as illustrated in reaction (4) above, the gelation time of the isocyanate polymers produced is drastically accelerated in the presence of water because the reaction of isocyanate resins with amines is extremely fast as compared to the reaction thereof with alcohols and acids (reactions (1) and (2) above). Due to the presence of some free water in tubing joints, truckline elbows, collars, etc., premature gelation i.e., "flash sets", have been experienced in using isocyanate polymers to treat subterranean well formations even when extensive procedures to remove water such as preflushing the tubular goods with acetone followed by trichloroethylene have been carried out. Such flash sets have left the tubing and occasionally truck tanks and lines plugged off with gelled isocyanate polymer, a condition which is difficult and expensive to correct. Consequently, most, if not all, of the heretofore used well treating procedures using isocyanate polymers have been abandoned.

The most common catalysts which have been utilized heretofore for bringing about the gelation of isocyanate resins are tertiary amines. Examples of such amines are triethylamine, pyridine, triallylamine, 2,4,6-dimethylaminomethylphenol and B-dimethylaminopropionitrile. As mentioned above, these amines not only catalyze reaction (1) above but also catalyze reaction (4) which brings about premature gelation of the isocyanate compounds when water is present as well as excess foam.

By the present invention, improved methods of forming isocyanate polymers are provided whereby the polymers have a long gelation time in the presence of water without the formation of excess foam. While the methods of this invention have particular utility and applicability to the treatment of subterranean well formations, the methods also have utility in a variety of other applications where long and predictable gelation times in the presence of water are advantageous and foaming of the polymers is not desired.

The methods of the present invention for forming isocyanate polymers having long gelation times in the presence of water without the formation of excess foam comprise combining a di- or polyisocyanate compound or mixture of such compounds with an alcoholic or acidic compound and a specific catalyst which does not catalyze reaction (4) above, i.e., the reaction of water with the di- or polyisocyanate compounds to form amines, and thereby does not bring about premature gelling of the isocyanate polymers produced when water is present. Catalysts which have the above-described property and which are suitable for use in accordance with this invention are triethylenediamine and metal-organic compounds of Groups 3 and 4 (Periodic Table) metals, e.g., tin, lead, titanium, germanium, zirconium and hafnium. Examples of such metal-organic compounds which are particularly suitable are dibutyltin diacetate, dibutyltin dichloride and tributyl titanate.

In accordance with the method of the present invention any of a wide variety of organic di- or polyisocyanates or mixtures of such isocyanates such as those described in U.S. Pat. No. 2,877,212 to Seligman and U.S. Pat. No. 2,822,373 to Beck, both of which are incorporated herein and made a part hereof by reference, can be utilized. Examples of such isocyanates are aromatic, aliphatic and cycloaliphatic diisocyanates, polymers of such compounds and mixtures thereof. Representative compounds include tolylene diisocyanate, m-phenylene diisocyanate, 4-4'-biphenylene diisocyanate, 3-isocyanatomethyl-3,5,5 trimethylcyclohexylisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate) and 1,5-tetrahydronaphthylene diisocyanate and polymethylene polyphenylisocyanate. Of these, tolylene diisocyanate and polymethylene polyphenylisocyanate are preferred.

Compounds such as tolylene diisocyanate in which the two isocyanate groups differ in reactivity are particularly desirable. The diisocyanates may contain other substituents, although those which are free from reactive groups other than the isocyanate groups are ordinarily preferred. In the case of aromatic compounds, the isocyanate groups may be attached either to the same or to different rings.

The organic di- or polyisocyanate compound or compounds used are combined with an alcoholic or acidic compound and a catalyst selected from the group consisting of triethylenediamine and the above-described metal-organic compounds. The resulting mixture has a long and predictable gelation time in the presence of water, and consequently, can be pumped or otherwise passed through a well bore into the area therein to be treated even though free water is present. The most preferred catalyst for use in accordance with this invention is triethylenediamine.

Preferably, an alcoholic compound is utilized to form the isocyanate polymer, and most preferably, an hydroxylated organic polymer such as hydroxyl terminated (allylic) polybutadiene. The di- or polyisocyanate compound and hydroxylated organic polymer can be prereacted to form a product having remaining reactive isocyanate groups, e.g., the condensation product of castor oil (glycerol trirecinolate) and tolylene diisocyanate. The di- or polyisocyanate compound and hydroxylated organic polymer or the condensation product thereof can be dissolved in a solvent and fillers can be included in the mix to increase the volume thereof. Particularly preferred solvents for use in accordance with this invention are liquid aliphatic hydrocarbons, aromatic hydrocarbons and mixtures of such hydrocarbons. Examples of such solvents are a blend of aromatic compounds having ethylnapthalene as a major component, blends of alkylaromatic compounds, toluene and diesel oil. Preferred fillers for use in accordance with this invention are carbon black, ground silica or sand. Other components can be included in the mix such as surface active agents.

In a preferred mix which includes an hydroxylated organic polymer, polyisocyanate compound and catalyst, the hydroxylated organic polymer is hydroxyl terminated (allylic) polybutadiene present in the mix in an amount of about 82 parts by weight per 100 parts of the mix, the polyisocyanate compound is polymethylene polyphenylisocyanate present in the mix in an amount of from about 1 to about 16 parts by weight per 100 parts of the mix and the catalyst is triethylenediamine present in the mix in an amount of about 1 part by weight per 100 parts of the mix.

In a preferred mix of the present invention including hydroxylated organic polymer, polyisocyanate compound, a solvent and a catalyst, the hydroxylated organic polymer is hydroxyl terminated (allylic) polybutadiene present in the mix in an amount of about 45 parts by weight per 100 parts of the mix, the polyisocyanate compound is polymethylene polyphenylisocyanate present in the mix in an amount in the range of from about 1 to about 10 parts by weight per 100 parts of the mix, the solvent is diesel oil present in the mix in an amount of about 45 parts by weight per 100 parts of the mix and the catalyst is triethylenediamine present in the mix in an amount of about 1 part by weight per 100 parts of the mix.

When fillers such as carbon black, ground silica or sand are utilized in the mix, they are added thereto in amounts compatible with the amount of solvent utilized.

Increasing the ratio of isocyanate group to hydroxyl group, i.e., the ratio of the quantity of di- or polyisocyanate compound used to hydroxylated organic polymer utilized, increases the gelation time of the mix. Thus, by varying the quantities of di- or polyisocyanate compound and hydroxylated organic polymer utilized in the mix, the gelation time of the mix can be varied.

In utilizing the methods of the present invention for treating subterranean well formations with the isocyanate polymers formed, the mix can be prepared in batch form at the surface prior to pumping it through the well bore into the area of the formation or well to be treated. An alternate procedure which can be utilized when a solvent is included in the mix is to combine the di- or polyisocyanate compound utilized and a portion of the alcoholic or acidic compound utilized with a portion of the solvent in a first solution. A second solution comprised of the remaining alcoholic or acidic compound, solvent and the catalyst used is then prepared. If a filler is used it can be combined with either or both of the separate solutions. The two solutions can be mixed together in a batch container immediately prior to placement of the mix or the two solutions can be pumped separately into a "Y" or "T" connection whereby they are mixed just prior to being conducted into the well bore or other area of use.

As will be understood by those skilled in the art, a variety of mixing techniques and/or orders of mixing can be utilized other than those specifically described herein depending upon the particular use to which the gelled isocyanate polymers are to be put.

The following examples are given to further illustrate the invention.

EXAMPLE 1

In the laboratory, various mixes of hydroxylated organic polymer, di- or polyisocyanate compound, catalyst and solvent with and without water, are prepared at room temperature and atmospheric pressure as shown in Table I below.

The gelation times of each of the mixes after they are prepared are determined. The results of these tests are shown in Table II below.

TABLE I

COMPOSITIONS OF HYDROXYLATED ORGANIC POLYMER-ISOCYANATE COMPOUND-SOLVENT-CATALYST MIXES

COMPONENTS, PARTS BY WEIGHT PER 100 PARTS OF MIX

| MIX NO. | Hydroxyl Terminated (Allylic) Polybutadiene | Triethylene-Diamine Catalyst[1] | Water | Polymethylene Polyphenyl-Isocyanate | Tolylene Di-Isocyanate | Solvent |
|---|---|---|---|---|---|---|
| 1 | 37.8 | | | 5.5 | | 56.7 |

TABLE I-continued
COMPOSITIONS OF HYDROXYLATED ORGANIC POLYMER-ISOCYANATE COMPOUND-SOLVENT-CATALYST MIXES
COMPONENTS, PARTS BY WEIGHT PER 100 PARTS OF MIX

| MIX NO. | Hydroxyl Terminated (Allylic) Polybutadiene | Triethylene-Diamine Catalyst[1] | Water | Polymethylene Polyphenyl-Isocyanate | Tolylene Di-Isocyanate | Solvent |
|---|---|---|---|---|---|---|
| 2 | 37.7 | 0.2 | | 5.5 | | 56.6 |
| 3 | 37.38 | 0.19 | 0.94 | 5.42 | | 56.07 |
| 4 | 38.72 | 0.2 | | | 3.0 | 58.08 |
| 5 | 38.35 | 0.19 | 0.96 | | 2.97 | 57.53 |

[1]Mixture containing one part by weight triethylenediamine and
[2]parts by weight dipropylene glycol.

TABLE II
GELATION TIMES MIXES OF TABLE I USING VARIOUS SOLVENTS

| Solvent Used | Gelation Time, Minutes | | | | |
|---|---|---|---|---|---|
| | Mix No. 1 | Mix No. 2 | Mix No. 3 | Mix No. 4 | Mix No. 5 |
| Aromatic Blend[1] | 545 | 26 | 94 | 209 | 246 |
| Alkyl aromatic Blend | 678 | 55 | 229 | 385 | 511 |
| Toluene No. 1 | 652 | 59 | 148 | 304 | 363 |
| Diesel Oil No. 2 | 1037 | 49 | 154 | 265 | 528 |
| Diesel Oil | 643 | 39 | 87 | 303 | 448 |

[1]A blend of aromatic compounds including ethylnapthalene as a major component.

As shown in Table II, the catalyst accelerates the gelation of the mixes (compare mix 1 containing no catalyst with mix 2 containing catalyst), but when water is present it acts as a retarder (compare mix 2 containing catalyst and mix 3 containing catalyst and water as well as mix 4 containing catalyst and mix 5 containing catalyst and water).

EXAMPLE 2

In the laboratory, mixes containing 19.3 parts by weight hydroxyl terminated (allylic) polybutadiene, 2.35 parts by weight polymethylene polyphenylisocyanate, 77.14 parts by weight of an aromatic blend solvent, 2.02 parts by weight of various catalysts and 0.2 parts by weight water are prepared at room temperature and atmospheric pressure. Similar mixes containing the same components but without water are also prepared. The gelation times of each of the mixes is determined after preparation. The results of these tests are shown in Table III below.

TABLE III
GELATION TIMES OF MIXES USING VARIOUS CATALYSTS

| Catalyst Used | Gelation Time, Minutes | |
|---|---|---|
| | Without Water | With Water |
| Triethylenediamine[1] | 20 | 25[2] |
| Dibutyltin Diacetate | 9 | 11[2] |
| Tributyl Titanate | 491 | 682[2] |
| 2,4,6-dimethylaminomethylphenol | 64 | 35[3] |
| Triethylamine | 24 | 13[3] |

[1]Mixture containing one part by weight triethylenediamine and 2 parts by weight dipropylene glycol.
[2]No foaming.
[3]Foaming occurred.

From Table III it can be seen that the triethylenediamine and the metal-organic catalysts utilized in accordance with the present invention do not accelerate gelation or cause excessive foaming in the presence of water as do the heretofore used catalysts. Also, it can again be seen that the presence of water in the mixes containing triethylenediamine and metal-organic catalysts increases the gelation times thereof.

What is claimed is:

1. A method of sealing an area comprising mixing and placing in said area an isocyanate polymer forming mixture having a controllable gelation time in the presence of water said mixture comprising a di- or polyisocyanate compound, an alcoholic or acidic compound and a catalyst, tributyl titanate, wherein the catalyst, in the presence of water, does not promote additional foaming nor decrease the gelation time of said isocyanate polymer forming mixture.

2. A method of sealing an area comprising mixing and placing in said area an isocyanate polymer forming mixture having a controllable gelation time in the presence of water said mixture comprising polymethylene polyphenylisocyanate, hydroxyl terminated (allylic) polybutadiene, and a catalyst, tributyl titanate, wherein the catalyst, in the presence of water, does not promote additional foaming nor decrease the gelation time of said isocyanate polymer forming mixture, further characterized to include the step of combining a solvent with said mixture, wherein the solvent is selected from the group consisting of liquid aliphatic hydrocarbons, aromatic hydrocarbons and mixtures thereof.

3. A method of sealing an area of subterranean well formation comprising mixing and placing in said area an isocyanate polymer forming mixture having a controllable gelation time in the presence of water said mixture comprising a di- or polyisocyanate compound, an alcoholic or acidic compound and a catalyst, tributyl titanate, wherein the catalyst, in the presence of water, does not promote additional foaming nor decrease the gelation time of said isocyanate polymer forming mixture.

4. A method of sealing an area of subterranean well formation comprising mixing and placing in said area an isocyanate polymer forming mixture having a controllable gelation time in the presence of water said mixture comprising polymethylene polyphenylisocyanate, hydroxyl terminated (allylic) polybutadiene and a catalyst, tributyl titanate, wherein the catalyst, in the presence of water, does not promote additional foaming nor decrease the gelation time of said isocyanate polymer forming mixture, further characterized to include the step of combining a solvent with said mixture, wherein the solvent is selected from the group consisting of liquid aliphatic hydrocarbons, aromatic hydrocarbons and mixtures thereof.

* * * * *